(12) United States Patent
Suganuma et al.

(10) Patent No.: US 8,405,345 B2
(45) Date of Patent: Mar. 26, 2013

(54) VEHICLE BATTERY CHARGING SITE REGISTRATION DEVICE AND METHOD

(75) Inventors: Hideaki Suganuma, Yokohama (JP); Mamoru Kuraishi, Ome (JP); Kazunao Yamada, Toyota (JP); Takashi Naitou, Okazaki (JP); Toshiaki Niwa, Okazaki (JP); Fumiharu Ogawa, Okazaki (JP); Masatoshi Takahara, Okazaki (JP)

(73) Assignees: Toyota Jidosha Kabushiki Kaisha, Toyota-shi (JP); Denso Corporation, Kariya-shi (JP); Aisin AW Co., Ltd., Anjo-Shi (JP)

( * ) Notice: Subject to any disclaimer, the term of this patent is extended or adjusted under 35 U.S.C. 154(b) by 0 days.

(21) Appl. No.: 13/126,315

(22) PCT Filed: Oct. 26, 2009

(86) PCT No.: PCT/IB2009/007218
§ 371 (c)(1),
(2), (4) Date: Apr. 27, 2011

(87) PCT Pub. No.: WO2010/049779
PCT Pub. Date: May 6, 2010

(65) Prior Publication Data
US 2011/0213780 A1    Sep. 1, 2011

(30) Foreign Application Priority Data

Oct. 27, 2008   (JP) ................................ 2008-275935

(51) Int. Cl.
*H02J 7/14* (2006.01)
*H05K 7/14* (2006.01)
*G06F 19/00* (2011.01)

(52) U.S. Cl. ........ 320/104; 320/116; 320/139; 307/149; 707/740; 701/116

(58) Field of Classification Search .................. 320/104
See application file for complete search history.

(56) References Cited

U.S. PATENT DOCUMENTS

| | | | |
|---|---|---|---|
| 5,790,976 A * | 8/1998 | Boll et al. .................. | 455/456.5 |
| 6,778,905 B2 * | 8/2004 | Horikami ...................... | 701/468 |
| 2002/0165661 A1 | 11/2002 | Horikami | |
| 2005/0009564 A1 * | 1/2005 | Hayaashi et al. ............. | 455/558 |
| 2006/0052918 A1 * | 3/2006 | McLeod et al. .................. | 701/29 |
| 2008/0039989 A1 * | 2/2008 | Pollack et al. .................. | 701/22 |
| 2008/0136375 A1 * | 6/2008 | Nam et al. .................... | 320/134 |
| 2009/0140887 A1 * | 6/2009 | Breed et al. ................... | 340/990 |

FOREIGN PATENT DOCUMENTS

| | | |
|---|---|---|
| JP | 2001215124 A | 8/2001 |
| JP | 2006112932 A | 4/2006 |
| JP | 3847065 B2 | 9/2006 |

* cited by examiner

*Primary Examiner* — Yalkew Fantu
(74) *Attorney, Agent, or Firm* — Gifford, Krass, Sprinkle, Anderson & Citkowski, P.C.

(57) ABSTRACT

A site registering device that registers a site allowing charging where a vehicle battery can be charged, the device including: a position acquisition unit that acquires position information on a charging site where charging of the battery has been conducted; and a registering unit that specifies, on the basis of an actual charging result in the charging site, a category to which the charging site belongs among a plurality of categories, associates the charging site with the specified category and the position information, and registers the thus associated charging site as the site allowing charging.

7 Claims, 5 Drawing Sheets

VEHICLE BATTERY CHARGING SITE REGISTRATION DEVICE AND METHOD

BACKGROUND OF THE INVENTION

1. Field of the Invention

The invention relates to a device that registers a site and a method therefor.

2. Description of the Related Art

A device that registers a site allowing charging where a vehicle battery can be charged in map information is available (see, for example, Japanese Patent No. 3847065). The device described in Japanese Patent No. 3847065 automatically registers in map information a site where a battery has been charged in a state in which the vehicle position did not move as a stationary position of the charging device.

SUMMARY OF THE INVENTION

However, with the device described in Japanese Patent No. 3847065, for example, in a case where the user wishes to conduct charging for a long time, the device cannot determine whether the site allowing charging is suitable for charging for a long time. For this reason, it is possible that charging required by the user will not be completely conducted at the site allowing charging.

The invention provides a site registering device that can register a site allowing charging in a state in which it is possible to determine whether the site conforms to the required charging mode.

The first aspect of the invention relates to a site registering device that registers a site allowing charging where a vehicle battery can be charged, the device including: a position acquisition unit that acquires position information of on a charging site where charging of the battery has been conducted; and a registering unit that specifies, on the basis of an actual charging result in the charging site, a category to which the charging site belongs among a plurality of predetermined categories, associates the charging site with the specified category and the position information, and registers the thus associated charging site as the site allowing charging.

According to the first aspect, when a charging site is associated with position information and registered as a site allowing charging, the charging site can be classified and registered for each predetermined category, on the basis of an actual charging result in the charging site. The category as referred to herein is a class relating to a charging mode and, for example, the sites can be classified into sites with a high charging frequency (private residence and the like), sites with a low charging frequency (charging stations and the like), sites with a long charging time (private residence and the like), and sites with a short charging time (charging stations and the like). Therefore, where the user recognizes the category classified based on the actual charging result, the user can determine, for example, whether the registered site allowing charging is a site that has been suitable for charging for a long time or a site that has been suitable for charging for a short time. Therefore, by registering the sites allowing charging with such a classification based on the actual charging result, it is possible to provide the user with information on a site allowing charging that will allow the user to distinguish whether this site is suitable for the required charging mode.

In the first aspect, the actual charging result may be at least one of a charging time in the charging site and a charging frequency in the charging site. As a result, it is possible to provide the user with information on a site allowing charging that will allow the user to distinguish a site allowing charging that is suitable for the required charging mode, on the basis of charging time or charging frequency, or combination thereof.

Further, in the first aspect, the charging time may be calculated based on a variation amount of State Of Charge (SOC) of the battery. With such a feature, the charging time can be calculated even in a state in which the site registering device is stopped. Therefore, power consumption can be reduced.

The second aspect of the invention relates to a site registering method for registering a site allowing charging where a vehicle battery can be charged, the method including: acquiring position information on a charging site where charging of the battery has been conducted; specifying, on the basis of an actual charging result in the charging site, a category to which the charging site belongs among a plurality of predetermined categories; and associating the charging site with the specified category and the position information, and registering the thus associated charging site as the site allowing charging. As a result, the site allowing charging can be registered so that it is possible to distinguish whether this site is suitable for a required charging mode.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
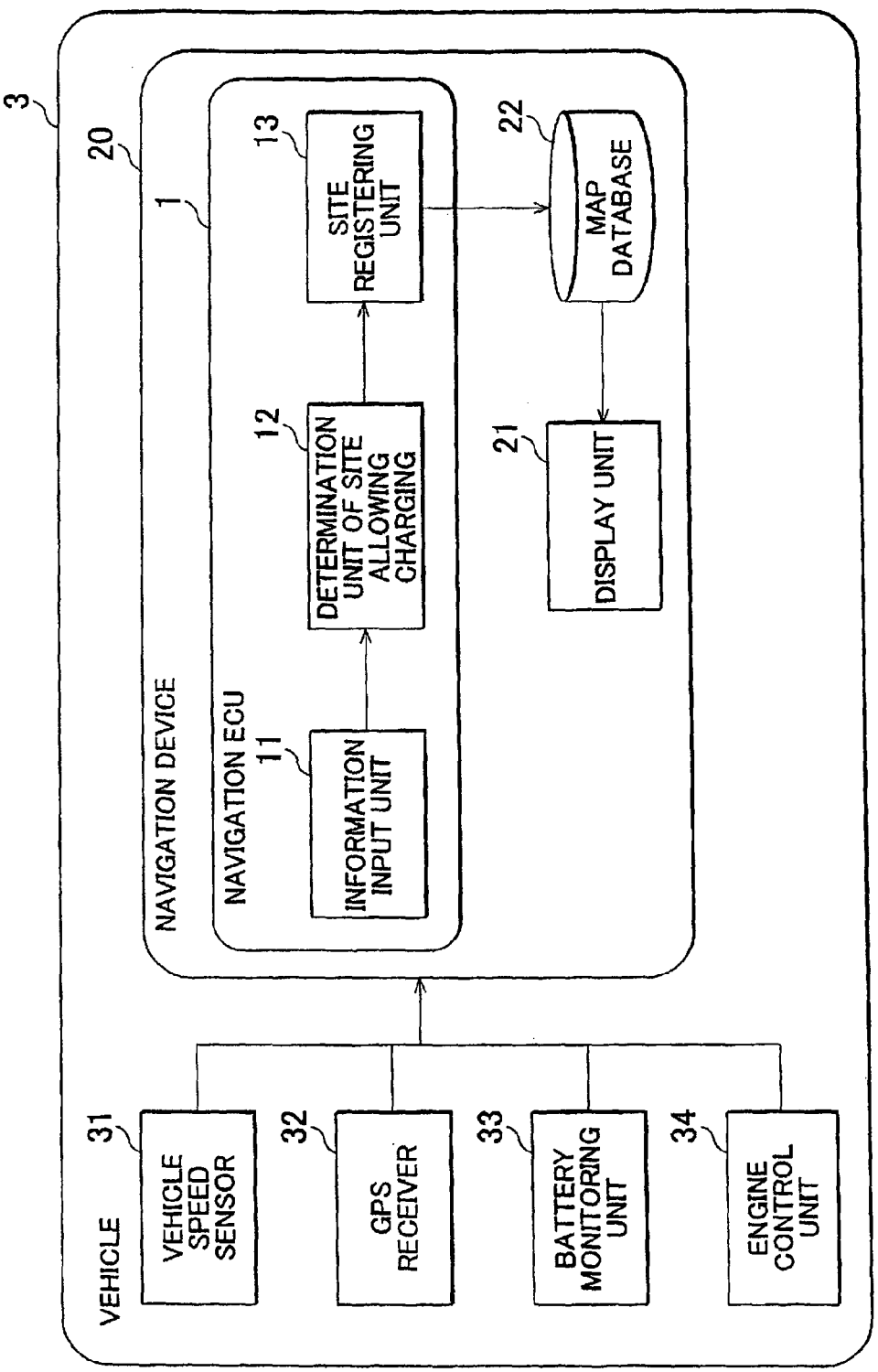
FIG. 1 is a block diagram illustrating a schematic configuration of a vehicle provided with a site registering device of an embodiment.

An embodiment of the invention will be described below with reference to the appended drawings. In the drawings, like or corresponding components will be assigned with identical reference characters and redundant explanation thereof will be omitted.

The site registering device of the embodiment can be advantageously used, for example, at a plug-in hybrid vehicle or electric automobile that has a car navigation system installed thereon.

First, the vehicle provided with the site registering device of the invention will be schematically explained. FIG. 1 is a schematic diagram of a vehicle provided with a site registering device of the embodiment. A vehicle 3 shown in FIG. 1 is provided with a vehicle speed sensor 31, a Global Positioning System (GPS) receiver 32, a battery monitoring unit 33, an engine control unit 34, and a navigation device 20. The GPS is a measuring system using satellites and can be advantageously used for determining the present position of the own vehicle.

The vehicle speed sensor 31 detects the speed of the vehicle 3. For example, a sensor that detects the vehicle speed by detecting the rotation of wheels as pulses with a magnet provided at a wheel and a Hall element provided at the vehicle can be used as the vehicle speed sensor 31. The vehicle speed sensor 31 is connected to the navigation device 20 and has a function of outputting the detected vehicle speed to the navigation device 20.

The GPS receiver 32 has a function of receiving the position information on the vehicle 3. The GPS receiver 32 is connected to the navigation device 20 and has a function of outputting the received position information to the navigation device 20.

The battery monitoring unit 33 has a function of detecting a SOC of a battery (not shown in the figure) provided at the vehicle 3. Further, the battery monitoring unit 33 is connected to the navigation device 20 and has a function of outputting the detected battery SOC to the navigation device 20.

The engine control unit 34 has a function of controlling the start (engine ON) and stop (engine OFF) of the engine. Further, the engine control unit 34 is connected to the navigation device 20 and has a function of outputting the ON/OFF state of the engine to the navigation device 20.

The navigation device 20 has a function of conducting path guidance and the like to a predetermined site (for example, a target location) and is provided with a display unit 21, a map database 22, and a navigation Electronic Control Unit (ECU) 1. The ECU is a computer of an automobile device conducting electronic control and is configured by providing a Central Processing Unit (CPU), memories such as a Read Only Memory (ROM) and a Random Access Memory (RAM), and an input-output interface.

The display unit 21 has a function of presenting information visually to the driver and uses, for example, a display.

The map database 22 stores a roadmap and is configured to be writable.

The navigation ECU 1 is provided with an information input unit 11, and a determination unit 12 of a site allowing charging, and a site registering unit 13. The navigation ECU 1, information input unit 11, and site registering unit 13 function as a site registering device, a position information acquisition unit, and a registering unit, respectively. The information input unit 11 has a function of acquiring the vehicle speed outputted by the vehicle speed sensor 31, position information outputted by the GPS receiver 32, battery SOC outputted by the battery monitoring unit 33, and engine ON/OFF state outputted by the engine control unit 34. Further, the information input unit has a function of outputting the acquired information to the determination unit 12 of a site allowing charging and site registering unit 13.

The determination unit 12 of a site allowing charging has a function of determining whether the present site is a site allowing charging, on the basis of a variation amount relating to the battery SOC in the present site. Further, the determination unit 12 of a site allowing charging has a function of calculating the variation amount of the battery SOC by comparing the battery SOC immediately before the engine OFF with the battery SOC immediately after the engine ON, and determining whether the present site is a site allowing charging in a case where the engine OFF in the present site is recognized. The determination unit 12 of a site allowing charging also has a function of outputting the determination result relating to the site allowing charging to the site registering unit 13.

The site registering unit 13 has a function of registering the present site as a site allowing charging in the map database 22 on the basis of the output results outputted by the determination unit 12 of a site allowing charging. Further, the site registering unit 13 has a function of classifying the present site for each category on the basis of the actual charging results of batteries, which have been inputted by information input unit 11, in the present site, and registering the category of the present site and position information of on the present site as the site allowing charging in the map database 22. The category as referred to herein is a class relating to a charging mode and, for example, the sites can be classified into sites with a high charging frequency (private residence and the like), sites with a low charging frequency (charging stations and the like), sites with a long charging time (private residence and the like), and sites with a short charging time (charging stations and the like). The actual charging result is a past or present charging result. The variation amount of SOC, charging frequency in this site, and charging time in this site that is calculated from the variation amount of the SOC can be used. In a case where the charging time is calculated from the variation amount of SOC, the calculation can be conducted, for example, under an assumption that the charging amount per unit time is the same in all charging sites.

Figure 2:
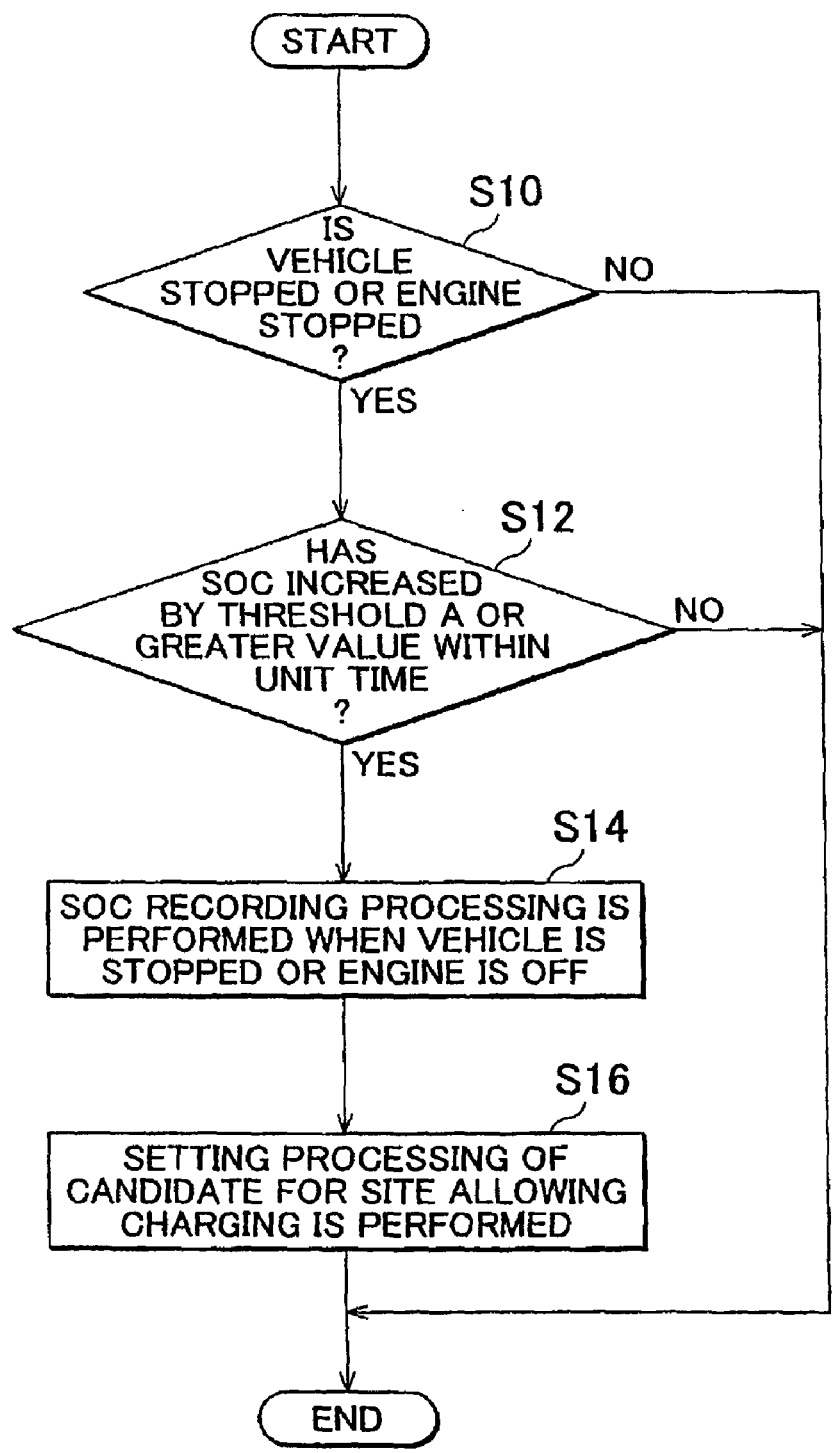
FIG. 2 is a flowchart illustrating the operation of the site registering device of the embodiment.

The operation of the navigation ECU 1 of the example will be explained below. FIGS. 2 to 5 are flowcharts illustrating the operation of the navigation ECU 1 of the embodiment. First, the processing executed when the vehicle 3 arrives to a predetermined site will be explained with reference to FIG. 2. The control processing shown in FIG. 2 is started, for example, at a timing at which the vehicle 3 arrives at the predetermined site and executed repeatedly with a predetermined interval. To facilitate the explanation and understanding, an example in which the vehicle reached the charging site will be explained below.

Where the control processing shown in FIG. 2 is started, first, an engine state recognition processing is conducted (S10). The processing of S10 is executed by the determination unit 12 of a site allowing charging to determine whether the engine has been stopped or the vehicle is stopped in the charging site (present site). The determination unit 12 of a site allowing charging acquires the engine ON/OFF state, which has been outputted by the engine control unit 34, via the information input unit 11 and determines whether the engine has been stopped. Alternatively, the determination unit of a site allowing charging acquires the vehicle speed information, which has been outputted by the vehicle speed sensor 31, via the information input unit 11 and determines whether the vehicle 3 has been stopped. In the processing of S10, a transition is made to SOC determination processing (S12) when the vehicle 3 or the engine is determined to be stopped.

The processing of S12 is executed by the determination unit 12 of a site allowing charging to determine whether the battery SOC in the charging site has changed by a predetermined value or a larger value within a unit time. The determination unit 12 of a site allowing charging acquires the battery SOC at the charging site and determines whether it has increased by a threshold A or a larger value, for example, within 2 minutes. The determination unit 12 of a site allowing charging thus determines whether the engine has been stopped and the battery has been charged. The threshold A is set in advance, for example, according to charging performance of the battery. In a case where the battery SOC in the charging site is determined in the processing of S12 to have increased by the threshold A or a greater value within the predetermined time, the battery charging is assumed to have been started and a transition is made to a SOC recording processing (S14).

The processing of S14 is executed by the determination unit 12 of a site allowing charging to record the battery SOC when the vehicle is stopped or the engine is OFF. The determination unit 12 of a site allowing charging records the battery SOC when the vehicle is stopped or the engine is OFF, for example, on a memory of the navigation ECU 1. Where the processing of S14 is completed, a transition is made to a candidate site setting processing (S16).

The processing of S16 is executed by the determination unit 12 of a site allowing charging to record a charging site as a candidate for a site allowing charging. The determination unit 12 of a site allowing charging acquires the position information, which has been outputted by the GPS receiver 32, via the information input unit 11 and records the position information of on the charging site as a candidate for a site allowing charging, for example, on a memory of the navigation ECU 1. Alternatively, a road identifier on the map database 22 that is the closest to the position information may be recorded as a candidate for a site allowing charging. Where the processing of S16 is ended, the control processing shown in FIG. 2 also ends.

In a case where the vehicle 3 is not stopped or the engine is not OFF in the processing of S10, the electric current in the navigation device 20 is not cut off following the engine OFF and therefore the control processing shown in FIG. 2 is ended. Further, in a case where the SOC is not increased by the threshold A or a greater value within the unit time in the processing of S12, the battery charging cannot be assumed to have started after the engine OFF and therefore the control processing shown in FIG. 2 is ended.

By executing the control processing shown in FIG. 2, it is possible to determine a candidate for a site allowing charging within a short time after the engine has been stopped, and when the candidate for a site allowing charging is present, the site allowing charging can be preset in a case where the engine is stopped when the target site is reached. Thus, because a processing of verifying whether the site is a site allowing charging is not conducted after the engine has been stopped, the processing executed after the engine has been stopped is simplified and the control time can be shortened. As a result, consumption of extra power can be prevented.

Figure 3:
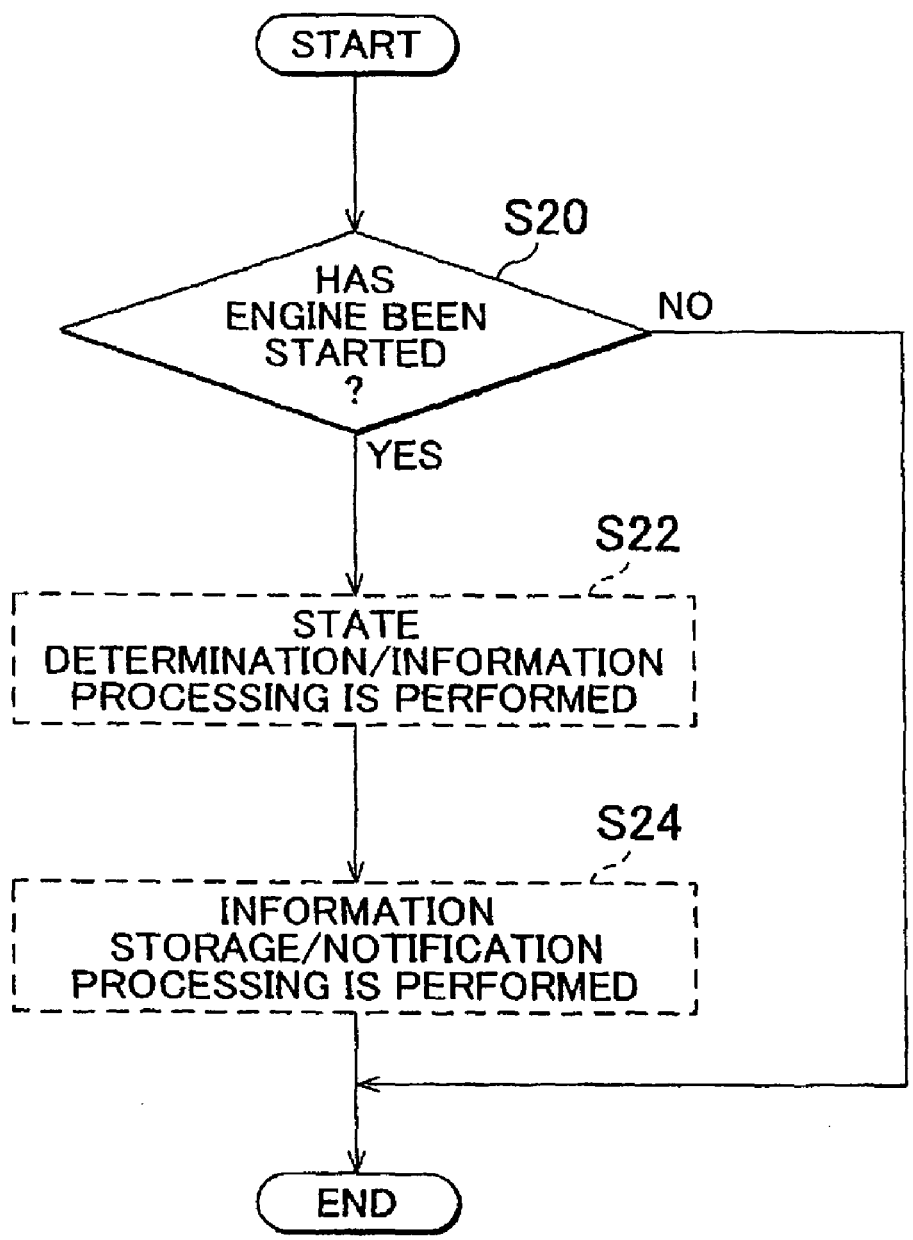
FIG. 3 is a flowchart illustrating the operation of the site registering device of the embodiment.

The processing executed after the control processing shown in FIG. 2 will be explained with reference to FIG. 3. The control processing shown in FIG. 3 is started at a timing the navigation device 20 is energized and repeatedly executed with a predetermined interval after, for example, the vehicle 3 has reached the charging site and the processing shown in FIG. 2 has been executed.

Where the control processing shown in FIG. 3 is started, it is started from engine state verification processing (S20). The processing of S20 is executed by the determination unit 12 of a site allowing charging to determine whether the engine has been started at the charging site (present site). The determination unit 12 of a site allowing charging acquires the ON/OFF state of the engine, which has been outputted by the engine control unit 34, via the information input unit 11 and determines whether the engine has been started. In a case where the engine is determined to have been started in the processing of S20, a transition is made to the state determination processing or information processing (S22).

The processing of S22 is executed by the determination unit 12 of a site allowing charging to determine the battery SOC state at the charging site or to process the actual result information relating to charging. In these processing operations, the information for determining whether the charging site is a site allowing charging is acquired or calculated. This processing will be described below in greater detail. Where the processing of S22 ends, a transition is made to information storage processing or notification processing (S24).

The processing of S24 is executed by the site registering unit 13 to register the charging site in the map database 22 on the basis of the information acquired or calculated in the processing of S22, or executed by the navigation device 20 to convey the battery SOC information to the driver. This processing will be described below in greater detail. When the processing of S24 is ended, the control processing shown in FIG. 3 is ended.

In a case where the engine of the vehicle 3 has not been started in the processing of S20, the control processing shown in FIG. 3 is ended.

By executing the control processing shown in FIG. 3, it is possible to determine the battery SOC state, acquire or calculate the actual result information relating to charging, determine whether the site is a site allowing charging, and register the site allowing charging in a case when the engine continues running after the vehicle 3 has reached the charging site or when the engine has been stopped after the vehicle 3 has reached the charging site and then the engine has been started again.

Figure 4:
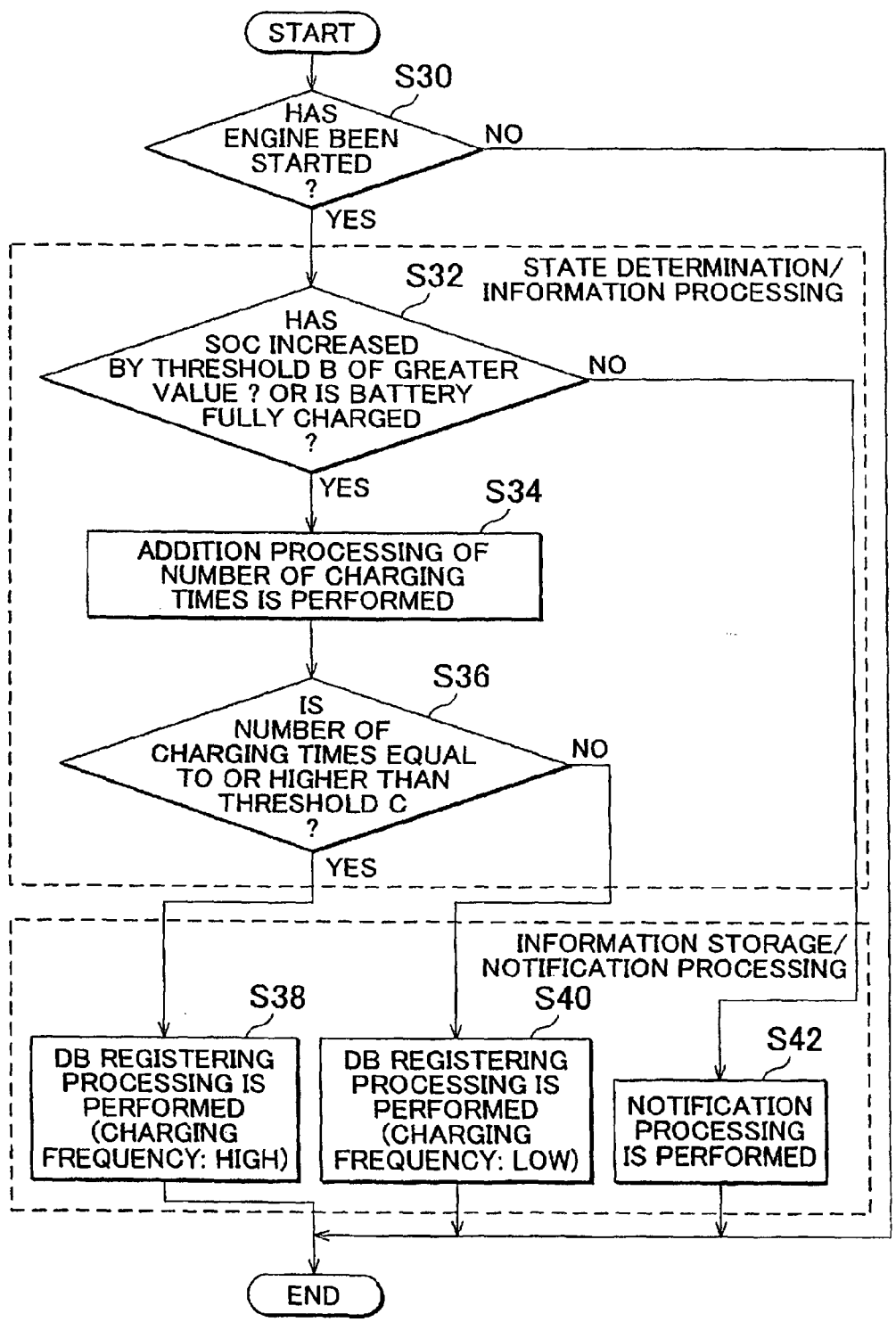
FIG. 4 is a flowchart illustrating the operation of the site registering device of the embodiment.

An example of processing shown in S22 and S24 in FIG. 3 will be explained below with reference to FIG. 4. The control processing shown in FIG. 4 is an example of the control processing shown in FIG. 3. The control processing shown in FIG. 4 is started at a timing the navigation device 20 is energized and repeatedly executed with a predetermined interval after, for example, the vehicle 3 has reached the charging site and the processing shown in FIG. 2 has been executed.

The control processing shown in FIG. 4 is started with an engine state confirmation processing (S30). The processing of S30 is similar to the processing of S20 shown in FIG. 3. In a case where the engine of the vehicle 3 has not been started in the processing of S30, the control processing shown in FIG. 4 is ended. By contrast, where the engine is determined to have been started in the processing of S30, a transition is made to the state determination processing (S32).

The processing of S32 is executed by the determination unit 12 of a site allowing charging to determine the battery SOC state at the charging site. For example, in a case where the engine continuous running after the vehicle 3 has reached the charging site, the battery SOC is monitored and variations in SOC within a predetermined time are determined. Further, for example, in a case where the engine has been stopped upon reaching the charging site and the engine was then started again, the SOC recorded in the processing of S14 shown in FIG. 2, that is, the SOC at the time the engine is stopped, is acquired and compared with the SOC at the time the engine is started to check the variations in SOC. The determination unit 12 of a site allowing charging determines, for example, whether the SOC has increased by a threshold B or a greater value. The threshold B is set in advance, for example, according to charging performance of the battery. The determination unit 12 of a site allowing charging also determines based on the SOC whether the battery is in a fully charged state. In a case where the variation amount of SOC is determined to be equal to or greater than the threshold B in the processing of S32, or where the battery is determined to be in a fully charged state, the charging site is determined to be a site allowing charging. A transition is then made to the addition processing of the number of charging times (S34).

The processing of S34 is executed by the site registering unit 13 to count the accumulated number of times the battery has been charged in the charging site. The site registering unit 13 adds 1 to the number of charging times (accumulated value) stored, for example, in the memory of the navigation ECU 1. Where the processing of S34 ends, a transition is made to the number of charging times determination processing (S36).

The processing of S36 is executed by the site registering unit 13 to determine whether the number of charging times calculated in the processing of S34 is equal to or greater than a threshold C. By executing the processing of S36, it is possible to determine whether the site is frequently used for charging. The threshold C may be set correspondingly to the frequency at which the user uses the vehicle. Where the number of charging times is found to be equal to or greater than C in the processing of S36, that is, the site is determined to be used frequently, a transition is made to registering in the map database 22 (S38).

The processing of S38 is executed by the site registering unit 13 to register the charging site as a site allowing charging that has a high charging frequency in the map database 22. The site registering unit 13 sets the category as "High Charging Frequency" and registers the site as the site allowing charging together with the position information on the charging site that has been outputted by the GPS receiver 32 in the map database 22. The registration in the map database 22 may be also conducted in association with the road identifier or the like. Where the processing of S38 is ended, the control processing shown in FIG. 4 is ended.

Meanwhile, where the number of charging times is found not to be equal to or greater than the threshold C in the processing of S36, that is, where the site is determined not to be frequently used, a transition is made to registering in the map database 22 (S40). The processing of S40 is executed by the site registering unit 13 to register the charging site as a site allowing charging that has a low charging frequency in the map database 22. The site registering unit 13 sets the category as, for example, "Low Charging Frequency" and registers the site as the site allowing charging together with the position information on the charging site that has been outputted by the GPS receiver 32 in the map database 22. The registration in the map database 22 may be also conducted in association with the road identifier or the like. Where the processing of S40 is ended, the control processing shown in FIG. 4 is ended.

Where the variation amount of SOC from the engine stop to the engine start is determined not to be equal to or greater than the threshold B (S32) and when the battery is determined not to be in a fully charged state, a transition is made to a notification processing (S42). The processing of S42 is executed in the navigation ECU 1 and display unit 21 to notify the user that the battery is not in a fully charged state. For example, the display unit 21 displays "Charging Incomplete" or a columnar graph representing the SOC state. Voice notification may be also made with a speaker (not shown in the figure) connected to the navigation device 20. By executing the processing of S42, it is possible to notify the user about the battery state. Therefore, the battery can be prevented from assuming an overdischarged state, that is, from being run out. Where the processing of S42 is ended, the control processing shown in FIG. 4 is ended.

The processing of S32, S34, and S36 shown in FIG. 4 corresponds to the processing of S22 shown in FIG. 3, and the processing of S38, S40, and S42 shown in FIG. 4 corresponds to the processing of S24 shown in FIG. 3. By executing the control processing shown in FIG. 4, in a case where the vehicle 3 has reached the charging site and the engine continues running or when the vehicle 3 has reached the charging site and the engine has thereafter been stopped and then restarted, it is possible to determine the state of the battery SOC and whether the site is a site allowing charging, determine the category to which the site belongs on the basis of charging frequency of the site, and register the category of the site allowing charging and the position information. Therefore, for example, when the user refers to and searches the map database 22, the sites allowing charging can be distinguished based on the charging frequency. Further, it is possible to determine whether the charging can be conducted in a mode required by the user. In addition it is possible to classify the site allowing charging that has a high charging frequency as "Own Residence" and a site allowing charging that has a low charging frequency as "Charging Station" and register the sites as such in the map database 22.

Figure 5:
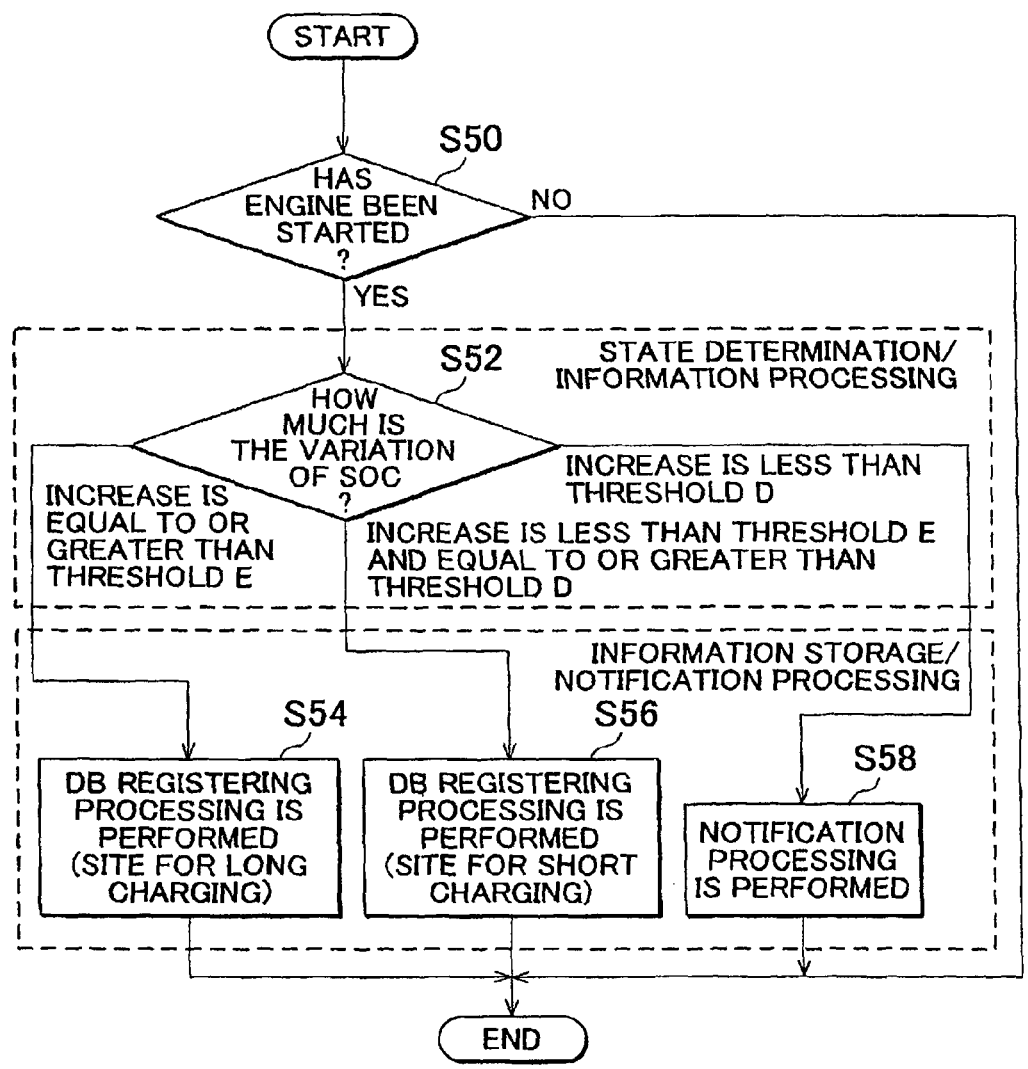
FIG. 5 is a flowchart illustrating the operation of the site registering device of the embodiment.

Another example of the processing of S22 and S24 shown in FIG. 3 will be explained below with reference to FIG. 5. The control processing shown in FIG. 5 is one example of the control processing shown in FIG. 3. The control processing shown in FIG. 5 is started at the timing in which the navigation device 20 is energized and repeatedly executed with a predetermined interval after the vehicle 3 has reached the charging site and the processing shown in FIG. 2 has been executed.

The control processing shown in FIG. 5 is started with the engine state confirmation processing (S50). The processing of S50 is similar to the processing of S20 shown in FIG. 3. Where the engine of the vehicle 3 is not determined to have been started in the processing of S50, the control processing shown in FIG. 5 is ended. In a case where the engine is determined to have been started in the processing of S50, a transition is made to a state determination processing (S52).

The processing of S52 is executed by the determination unit 12 of a site allowing charging to determine the battery SOC state in the charging site. For example, in a case where the engine continues running after the vehicle 3 has reached the charging site, the battery SOC is monitored and the variation in SOC within a predetermined interval is determined. Further, in a case where the engine is stopped after the vehicle 3 has reached the charging site and then restarted, the SOC recorded in the processing of S14 shown in FIG. 2, that is, the SOC at the time the engine is stopped, is acquired and compared with the SOC at the time the engine runs to confirm the variation in SOC. The determination unit 12 of a site allowing charging determines, for example, whether the increment variation amount of SOC is less than the threshold D, or equal to or greater the threshold D and less than the threshold E, or equal to or greater than the threshold E. The thresholds D and E satisfy the relationship D<E and determine in advance the charging performance of the battery. In a case where the variation amount of SOC is determined to be equal to or greater than the threshold E in the processing of S52, the charging site is determined to be a site allowing charging. A transition is then made to a procedure of registering the site allowing charging in the map database 22 (S54).

The processing of S54 is executed by the site registering unit 13 to register the charging site as a site allowing charging where charging can be conducted for a long time in the map database 22. The site registering unit 13 sets the category as "Suitable for Long-Term Charging" and registers the site as the site allowing charging together with the position information on the charging site that has been outputted by the GPS receiver 32 in the map database 22. The registration in the map database 22 may be also conducted in association with the road identifier or the like. Where the processing of S54 is ended, the control processing shown in FIG. 5 is ended.

Meanwhile, where the variation amount of SOC is determined to be equal to or greater than the threshold D and less than the threshold E in the processing of S52, the charging site is determined as a site allowing charging. Then, a transition is made to registering in the map database 22 (S56). The processing of S56 is executed by the site registering unit 13 to register the charging site as a site allowing charging, but unsuitable for charging for a long time in the map database 22. The site registering unit 13 sets the category as, for example, "Unsuitable for Charging for a Long Time" and registers the site as the site allowing charging together with the position information on the charging site that has been outputted by the GPS receiver 32 in the map database 22. The registration in the map database 22 may be also conducted in association with the road identifier or the like. Where the processing of S56 is ended, the control processing shown in FIG. 5 is ended.

In the processing of S52, where the variation amount of SOC is determined to be less than the threshold D, a transition is made to a notification processing (S58). The processing of S58 is similar to the processing of S42 shown in FIG. 4. Where the processing of S58 is ended, the control processing shown in FIG. 5 is ended.

The processing of S52 shown in FIG. 5 corresponds to the processing of S22 shown in FIG. 3, and the processing of S54, S56, and S58 shown in FIG. 5 corresponds to the processing of S24 shown in FIG. 3. By executing the control processing shown in FIG. 5, in a case where the vehicle 3 has reached the charging site and the engine continuous running or when the vehicle 3 has reached the charging site and the engine has thereafter been stopped and then restarted, it is possible to determine the state of the battery SOC and whether the site is a site allowing charging, determine the category of the site on the basis of the variation amount of SOC in the site, and register the category of the site allowing charging and the position information. Therefore, for example, when the user refers to and searches the map database 22, the sites allowing charging can be distinguished based on the charging time. Therefore, it is possible to determine whether the charging can be conducted in a mode required by the user. In addition it is possible to classify the site allowing charging in which the charging time is long as "Own Residence" and a site allowing charging in which the charging time is not long as "Charging Station" and register the sites as such in the map database 22. Further, by associating the charging time with the SOC variation amount, it is possible to calculate the charging time even when the battery monitoring unit 33 and navigation device 20 are not energized during charging. Therefore, power consumption can be reduced.

As described hereinabove, with the site registering device 1 of the embodiment, the charging site is classified and recorded for each category determined based on the actual charging result for the battery in the charging site when the site allowing charging is registered. As a result, by confirming the category, the user can determine, for example, whether the registered site allowing charging is the own residence suitable for charging for a long time or a charging station suitable for charging for a short time. Thus, where a site allowing charging is classified on the basis of the actual charging result and registered, a site allowing charging that is different for each user, such as user's residence, can be registered automatically in the map database 22 and provided to the user.

The above-described embodiment illustrates an example of the site registering device in accordance with the invention. The site registering device in accordance with the invention is not limited to the site registering device of the embodiment, and the site registering device of the embodiment can be changed or applied differently without departing from the scope set forth in the claims.

Thus, in the above-described embodiment, an example is explained in which the navigation ECU 1 is provided with the determination unit 12 of a site allowing charging, but it is not necessary that the navigation ECU 1 is provided with the determination unit 12 of a site allowing charging, and other devices may be used to determine whether a site is allowing charging.

Further, in the above-described embodiment, the control processing operations shown in FIGS. 4 and 5 are explained as examples of the control processing shown in FIG. 3, but the control processing shown in FIG. 4 or 5 is not necessarily implemented independently. It is also possible to execute the control processing shown in both FIGS. 4 and 5 and conduct registration in the map database 22 for each category on the basis of information in which the results of both processing operations are combined. In this case even more accurate information can be registered.

Further, in the above-described embodiment, an example is explained in which the charging time is calculated based on variations in a charging amount, but for example a configuration may be used in which only the battery monitoring unit 33 continues operating and counts the charging time even after the engine has been stopped or the ignition has been switched off.

The invention claimed is:

1. A site registering device that registers a site allowing charging where a vehicle battery can be charged,
the device comprising:
a position acquisition unit that acquires position information on a charging site where charging of the battery has been conducted; and
a registering unit that specifies, on the basis of an actual charging result in the charging site, a category to which the charging site belongs among a plurality of predetermined categories, the predetermined categories include at least one of a category based on a charging frequency at the charging site or a category based on an amount of charging time at the charging site, the registering unit associates the charging site with the specified category and the position information, and registers the thus associated charging site as the site allowing charging.

2. The site registering device according to claim 1, wherein the actual charging result is at least one of a charging time in the charging site and a charging frequency in the charging site.

3. The site registering device according to claim 2, wherein the charging time is calculated based on a variation amount of SOC of the battery.

4. The site registering device according to claim 1, wherein the category is a class relating to a charging mode.

5. The site registering device according to claim 4, wherein the category is a class relating to a charging frequency.

6. The site registering device according to claim 4, wherein the category is a class relating to a charging time.

7. A site registering method for registering a site allowing charging where a vehicle battery can be charged,
the method comprising:
acquiring position information on a charging site where charging of the battery has been conducted;
specifying, on the basis of an actual charging result in the charging site, a category to which the charging site belongs among a plurality of predetermined categories, the predetermined categories include at least one of a category based on a charging frequency at the charging site or a category based on an amount of charging time at the charging site; and
associating the charging site with the specified category and the position information, and registering the thus associated charging site as the site allowing charging.

* * * * *